United States Patent [19]

Trozzi

[11] Patent Number: 5,000,462
[45] Date of Patent: Mar. 19, 1991

[54] SEALING ASSEMBLY FOR A BALL MILL PULVERIZER

[75] Inventor: Norman K. Trozzi, West Caldwell, N.J.

[73] Assignee: Foster Wheeler Energy Corporation, Clinton, N.J.

[21] Appl. No.: 472,919

[22] Filed: Jan. 31, 1990

[51] Int. Cl.⁵ .......................... F16J 15/38; F16J 15/16
[52] U.S. Cl. .......................... 277/12; 277/27; 277/81 R; 277/88; 241/179; 432/115
[58] Field of Search .................. 432/115; 277/12, 27, 277/71, 79, 81 R, , 88, 89, 90; 241/179, 182; 366/220

[56] References Cited

U.S. PATENT DOCUMENTS

| 770,660 | 9/1904 | Morcom | 277/90 |
| 3,190,660 | 6/1965 | Koch | 277/88 |
| 3,746,268 | 7/1973 | Kastrinos | 241/79 |
| 4,054,292 | 10/1977 | Stone | 277/12 |
| 4,199,155 | 4/1980 | Day et al. | 277/88 |
| 4,406,464 | 9/1983 | Schymura | 277/81 R X |
| 4,469,332 | 9/1984 | Brosdetzko et al. | 277/12 |

FOREIGN PATENT DOCUMENTS

| 2100142 | 8/1971 | Fed. Rep. of Germany | 432/115 |
| 113661 | 7/1983 | Japan | 277/27 |

Primary Examiner—William A. Cuchlinski, Jr.
Assistant Examiner—J. Folker
Attorney, Agent, or Firm—Marvin A. Naigur

[57] ABSTRACT

A seal assembly for a rotating drum in which a rotating member is secured relative to the drum for rotation therewith. An air chamber is provided adjacent the drum for introducing sealing air into the drum. At least one seal ring is secured to the rotating member for rotation therewith, and a seal member is disposed in an air chamber and is biased into sealing engagement with the seal ring by the air pressure in the chamber.

7 Claims, 2 Drawing Sheets

SEALING ASSEMBLY FOR A BALL MILL PULVERIZER

BACKGROUND OF THE INVENTION

This invention relates to a sealing assembly, and more particularly, to an assembly for sealing against the egress of air from a pressurized ball mill pulverizer assembly.

In the operation of any type of plant using pulverized coal for fuel, it is common practice to supply raw coal to a ball mill pulverizer to reduce the size of the coal and mix it with air. The main component of a typical ball mill is a large drum with hollow trunnions at each end forming an extension of the drum and providing space for introduction of the raw coal to the mill. The trunnions also define a bearing surface for permitting rotation of the drum and the drum is filled with a charge of forged steel balls to a level just below the bottom of the trunnions. As the drum is rotated, the balls are continuously lifted and tumbled by gravity onto the coal to pulverize the coal. Classifiers are usually located at each end of the mill and serve as separators, so as the pulverized coal leaves the grinding zone, oversized particles are rejected by gravity separation in a low velocity central section of the classifier and by centrifugal separation as the coal air stream passes around the baffles. The rejected material is mixed with the incoming raw coal feed and returned through the trunnion by screw conveyors for further grinding.

The mill is operated under positive pressure to avoid the abrasive wear and outages experienced with the exhausters on suction mills. Simple seals, usually consisting of a steel ring, are attached to the mill trunnion and a flexible gasket is attached to the classifier to prevent coal from blowing out through the clearance between the mill and the classifier trunnions, with the actual medium that seals the pulverizer being seal air introduced from a separate control source. In order for this seal air to be effective, it must be enclosed and prevented from escaping into the boiler house.

However, the relatively simple steel ring/flexible gasket seal assembly is not without problems. For example, due to axial expansion, the cold set position at start-up must be such that the seals are closed. Thus, as the pulverizer undergoes thermal expansion, the ring pushes on the fabric-like material causing increased pressure by deflection of the circular spring and resultant wear of the material. Also, coal dust that often infiltrates this area under various conditions acts like an abrasive and accelerates wear over and above the increased pressure caused by the deflected spring. The wearing of the material causes leakage over an extended period of time and resultant failure of the seal.

SUMMARY OF THE INVENTION

It is therefore an object of the present invention to provide a sealing assembly for a ball mill pulverizer which constitutes an improvement over the prior art seals.

It is a still further object of the present invention to provide a sealing assembly of the above type in which the circular spring of the prior art device is eliminated in favor of a seal member which is loaded by air pressure.

It is a further object of the present invention to provide a sealing assembly of the above type which utilizes a sealing member attached to a large ring to maintain flatness.

It is a further object of the present invention to provide a sealing assembly of the above type in which the entire assembly is flexibly sealed so that there is a minimum of mechanical resistance to motion due to expansion.

It is a still further object of the present invention to provide a sealing assembly of the above type which permits a lubricant to be injected into the are where the mating surfaces are rubbing during operation to further extend the reliability of the assembly.

It is a still further object of the present invention to provide a sealing assembly of the above type in which the seal member is mounted in a manner to render the position of the seal member adjustable relative to the seal ring to accommodate wear of the ring and thermal expansion and contraction of the mill.

Toward the fulfillment of these and other objects, the seal assembly of the present invention includes at least one seal ring secured to a rotating member fastened to the ball mill trunnion, for rotation therewith. An air chamber is provided adjacent the drum for introducing sealing air into the drum. A fixed member is disposed adjacent the mill and a seal member is disposed in the air chamber and is biased into a sealing engagement with the seal ring by the air pressure in the chamber. The position of the seal member can be adjusted relative to the seal ring to accommodate wear of the ring and thermal expansion and contraction of the mill.

DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings wherein.

DESCRIPTION OF THE PREFERRED EMBODIMENT

Figure 1:
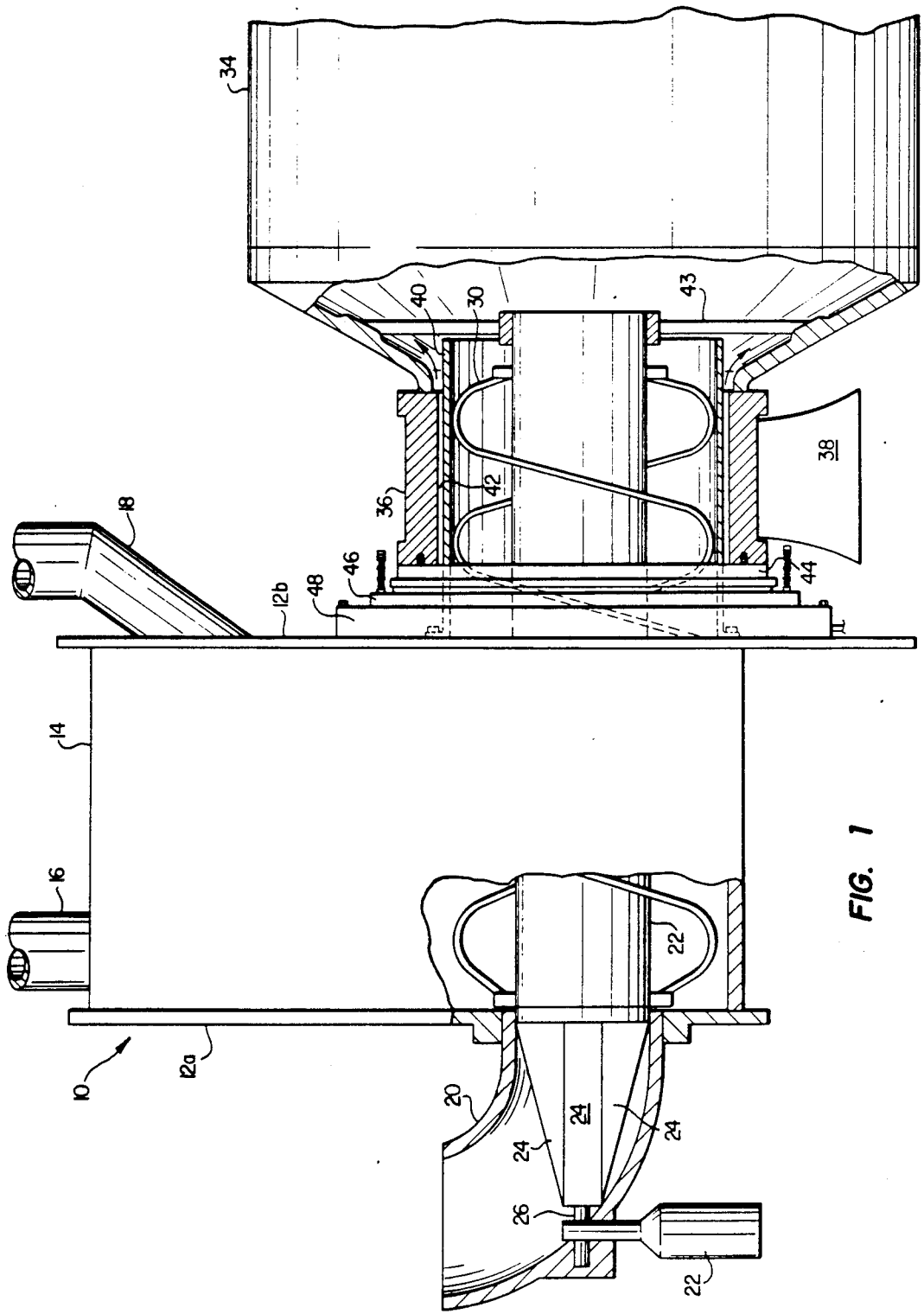
FIG. 1 is a partial front elevational view, with a portion in section, depicting the sealing assembly of the present invention shown mounted between a ball mill trunnion and a classifier.

Referring to FIG. 1 of the drawings, the reference numeral 10 refers to a particle coal classifier formed by front plate 12a, a rear plate 12b and a curved housing 14, extending between the two plates. An inlet pipe 16 extends into the upper portion of the housing 14 for introducing relatively coarse coal particles into the classifier, and an outlet pipe 18 extends from the plate 12b for discharging a mixture of crushed coal and air.

An elbow-shaped, hot air inlet pipe 20, extends outwardly from a corresponding opening formed in the front plate 12a and registers with a central air tube 22 extending through the classifier. Four arms (three of which are shown) 24 are connected to the left end of the air tube 22 as viewed in FIG. 1, extend outwardly through the opening in the front plate 12a, and are connected to the left end of the air tube 22. A support shaft 26 is connected to the free ends of the arms 24 and rotates in a bearing 28 disposed adjacent the classifier 10 to support the air tube 22 for rotational movement. Thus, the inlet pipe 20 is fixed, while the air tube 22, the arms 24, and the shafts 26 rotate. A spiraled ribbon conveyor 30 extends around the air tube 22 for conveying coal through the classifier in a left-to-right direction as the air tube rotates, as will be explained in greater detail.

A rotatable drum 34 is located adjacent the classifier 10 and is mounted on opposite ends of a pair of trunnions, with only the left end of the drum and its corresponding trunnion 36 being shown in FIG. 1. Each trunnion 36 is rotatably supported on a bearing 38.

Although not shown in the drawings, it is understood that a conventional system for rotating the drum 34 is provided. For example, a large ring gear can be mounted on the outside of the drum, which engages a drive gear mounted on a shaft driven by a motor Thus, when the motor is activated, its rotation is translated through the shaft to the drive gear which, in turn, engages this ring gear, thereby rotating the drum 34 and therefore the trunnions 36, about their longitudinal axes. Since the aforementioned components are conventional, they are not shown in the drawings, nor will they be described in any further detail.

A stationary trunnion tube 40 is coaxially disposed inside the trunnion 36 and extends from the plate 12b of the classifier 10 to an area just inside the drum 34. The outer diameter of the tube 40 is slightly less than the inner diameter of the trunnion 36 to define an air passage 42 for reasons that will be described. A plurality of drive spokes 43 extend from the end of the air tube 22 opposite the end that registers with the inlet pipe 20 and are secured to the inner wall of the drum 34. Thus, rotation of the drum 34 causes corresponding rotation of the air tube 22.

A rotating ring 44, a seal assembly 46, and a sealing air chamber 48 are all shown in general in FIG. 1 and will be described in greater detail later.

Thus, relatively coarse coal introduced into the classifier 10 via the inlet 16 falls to the bottom of the housing 14 just below the air tube 22. Rotation of the mill 34 causes corresponding rotation of the air tube 22, thus causing the ribbon conveyor 30 to drive the coal in a direction from left to right through the classifier 10, the trunnion 36 and into the drum 34. A plurality of steel balls (not shown) are provided in the drum 34 and constantly move as the drum rotates, to act on the coal to crush or pulverize it. Air from the inlet pipe 20 passes through the rotating air tube 22 and enters the drum where it mixes with the crushed coal. The resulting mixture passes into the space between the upper portion of the air tube 22 and the trunnion tube 40 and the space between the lower portion of the air tube and the relatively coarse coal as the latter passes from the classifier 10 into the drum 34.

It is understood that the classifier contains a plurality of baffles (not shown) which function to separate particles that exceed a predetermined size from the mixture of air and relatively fine particles by centrifugal forces. (This technique is conventional and is taught in U.S. Pat. No. 4,450,071, also assigned to the assignee of the present invention.) The relatively coarse particles fall into the bottom of the classifier 10 for recycle back into the drum 34 under the action of the ribbon conveyor 30, while the mixture of air and relatively fine particles discharges from the classifier 10 via the outlet 18 to a furnace or the like.

Figure 2:
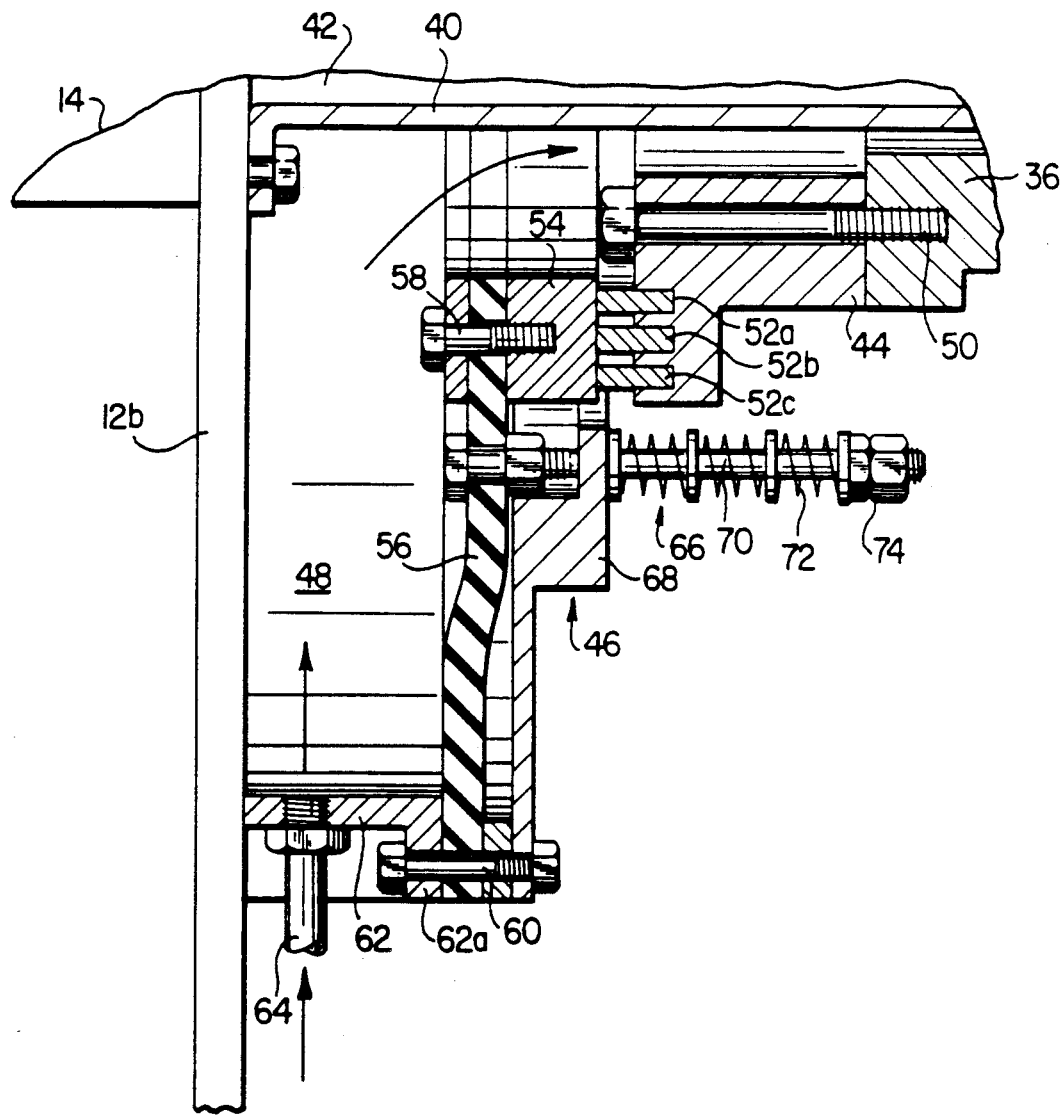
FIG. 2 is an enlarged sectional view depicting the sealing assembly of the present invention.

Referring to FIG. 2, the rotating ring 44 is bolted to an end of the trunnion 36 for rotation therewith by a plurality of angularly spaced bolts, one of which is shown by the reference numeral 50. Three seal rings, 52a, 52b and 52c, are secured in axial slots in the exposed face of the rotating ring 44 and engage a ring 54 which is bolted to a flexible ring 56 by a plurality of angularly spaced bolts 58. The outer peripheral portion of the flexible ring 56 is bolted, by a plurality of angularly spaced bolts 60, to a mounting ring 62 which is secured, in any known manner, to the plate 12b of the classifier 10. Thus the ring 54 is fixed with respect to rotational movement but is moveable in an axial direction due to the fact it is mounted to the unrestrained inner peripheral portion of the flexible ring 56. The mounting ring 62 defines the aforementioned sealing chamber 48 and has a radially outwardly extending flange 62a for receiving the bolts 60. An air inlet pipe 64 extends through the ring 62 for introducing sealing air into the chamber 48 for reasons that will be described.

A spring assembly, shown in general by the reference numeral 66, is provided for setting the initial cold position of the ring 54 relative to the seal rings 52a, 52b and 52c. To this end, a perforated plate 68 extends adjacent the outer face of the flexible ring 56 and is mounted relative to the mounting ring 62 by the bolt 60. A bolt 70 extends through the flexible ring 56 and the perforated plate 68 and projects from the latter plate. A spring 72 is mounted over the projecting portion of the bolt 70 between the perforated plate 68 and a nut assembly 74. The compression of the spring 72 is adjusted by the nut assembly 74 so that the spring tends to bias the flexible ring, and therefore the ring 54, into engagement with the seal rings 52a, 52b and 52c. In this position, the flexible ring 56 is slightly spaced from the perforated plate 68 in order to ensure engagement of ring 54 with the seal rings 52a, 52b and 52c due to wear and despite changes in alignment during use.

It is understood that, although only one spring assembly 66 and bolts 50, 58 and 60 are shown in FIG. 2, a plurality of each of these components are angularly spaced for 360 degrees.

The sealing air introduced into the chamber 48, via the inlet pipe 64, flows from the chamber into and through the annular space between the trunnion 36 and the trunnion tube 40 for the purpose of preventing escape of the pressurized air and entrained relatively fine coal pulverized particles from the mill.

In operation, the drum 34, and therefore the trunnion 36, the ring 44 and the seal rings 52a, 52b and 52c rotate in the manner described above. Sealing air is passed into the chamber 48 and into the space between the trunnion 36 and the trunnion tube 40 to prevent leakage of the air and entrained relatively fine coal particles from the drum 34. The sealing air also biases the unrestrained inner peripheral portion of the flexible ring 56, and therefore the ring 54, against the seal rings 52a, 52b and 52c which function to prevent escape of the sealing air and some possible entrained dust into the ambient boiler house.

The seal assembly of the present invention, therefore, has several advantages. For example, the circular spring of the prior art device is eliminated in favor of a seal member which is loaded by air pressure. Thus, no matter what the position of the rotating ring, the load on the mating surfaces does not change since the seal pressure provided by the air is virtually constant. Also, the relatively large, flexible ring 56 minimizes mechanical resistance to motion due to expansion. Further, a lubricant can be injected into the area where the mating surfaces are rubbing during operation, further extending the reliability of the assembly. Still further, the inner peripheral portion of the ring 54 is free to float axially and adjust itself relative to the rings 52a, 52b and 52c to accommodate the expected wear and changes in alignment of the rings during use, as well as thermal expansion and contraction of the mill.

A latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A seal assembly for a rotating drum comprising a rotating member secured relative to said drum for rotation therewith, means defining an air chamber adjacent said drum for introducing sealing air into said drum, at least one seal ring secured to said rotating member for rotation therewith, and flexible seal means fixed with respect to rotation movement and disposed in said air chamber, said flexible seal means being constructed and arranged so that the air pressure in said chamber exerts a substantially constant force on it to bias it into sealing engagement with said seal ring.

2. The seal assembly of claim 1 further comprising means including adjustable means for adjusting the position of said flexible seal means relative to said seal ring to accommodate wear of said ring and thermal expansion and contraction of said drum.

3. The seal assembly of claim 1, wherein the axis of said flexible seal means extends parallel to the axis of said drum, and said flexible seal means moves in an axial direction relative to said seal ring.

4. The seal assembly of claim 3, further comprising a trunnion forming an extension of said drum, said rotating member being fixed to said trunnion, and wherein there are a plurality of seal rings, each having a portion extending in a corresponding slot in said rotating member and a portion projecting from said rotating member for engagement by said flexible seal means.

5. The seal assembly of claim 2, wherein said flexible seal means comprises a flexible ring and a rigid ring mounted to the inner peripheral portion of said flexible ring for engaging said seal ring, and further comprising means for engaging the outer peripheral portion of said flexible ring to mount said flexible ring so that the inner peripheral portion thereof floats in an axial direction in response to said air pressure.

6. The seal assembly of claim 1, further comprising a tube extending within said trunnion in a coaxial relationship thereto and communicating with said air chamber for passing coal from said classifier to said drum, said tube defining with said trunnion a passage for permitting said air to pass from said air chamber to said drum.

7. The seal assembly of claim 6, wherein said flexible seal means prevents leakage of air from said drum via said passage during rotation of said drum and said trunnion.

* * * * *